United States Patent [19]

Bornstein

[11] 4,230,600

[45] Oct. 28, 1980

[54] COMPOSITION FOR CONDITIONING SOFTWOOD LOGS PRIOR TO PEELING OPERATION

[75] Inventor: L. F. Bornstein, Atlanta, Ga.

[73] Assignee: Georgia-Pacific Corporation, Portland, Oreg.

[21] Appl. No.: 894,438

[22] Filed: Apr. 7, 1978

Related U.S. Application Data

[62] Division of Ser. No. 758,908, Jan. 3, 1977, Pat. No. 4,108,226.

[51] Int. Cl.[2] .......................... B01F 1/00; C09K 3/00

[52] U.S. Cl. .......................... 252/364; 162/DIG. 3; 252/192; 252/544

[58] Field of Search .......................... 252/364, 544, 192; 162/DIG. 3; 8/195

[56] References Cited

U.S. PATENT DOCUMENTS

| | | | |
|---|---|---|---|
| 2,373,951 | 4/1945 | Evans et al. | 252/364 X |
| 3,516,941 | 6/1970 | Matson | 252/182 X |
| 3,860,530 | 1/1975 | Howe | 252/364 X |
| 3,935,129 | 1/1976 | Jabalee | 252/544 X |

*Primary Examiner*—Richard D. Lovering
*Attorney, Agent, or Firm*—Schuyler, Birch, McKie & Beckett

[57] ABSTRACT

Veneer production from softwood logs is improved by adding at least about 0.003% of urea to the hot water soaking vats prior to peeling the veneer from the logs. Enhanced results are achieved when urea is added together with a base such as sodium hydroxide.

3 Claims, No Drawings

COMPOSITION FOR CONDITIONING SOFTWOOD LOGS PRIOR TO PEELING OPERATION

This is a division of Ser. No. 758,908, filed Jan. 3, 1977, now U.S. Pat. No. 4,108,226, issued Aug. 22, 1978.

BACKGROUND OF THE INVENTION

1. Field of the Invention

This invention relates to the method for improving the production of veneers from softwood logs by a peeling operation. More specifically, the invention relates to an improved soaking treatment prior to peeling the logs.

2. Description of the Prior Art

Some conditioning of softwood logs such as southern yellow pine has always been a prerequisite for the economic production of veneers for use inter alia in plywood manufacturing. This conditioning treatment generally has consisted of soaking the logs or blocks in hot water vats or exposing the logs to steam. The prior art conditioning methods, however, are extremely lengthy and are only about 45 to 55 percent effective in softening the logs enough to facilitate an optimum peeling operation. Attempts to peel the hot water-conditioned logs of the prior art result in considerable waste of both material and processing time. One of the major problems is "spin outs", i.e., breaking and splintering of the wood at hard areas such as around knots. A process which would facilitate smooth, even, and uninterrupted peeling of logs would provide great savings in both material and processing time and thus would be very valuable. Such a process would be particularly valuable in view of the current utilization of vast quantities of veneer in plywood and related products which result in the more efficient usage of wood—a rapidly dwindling natural resource.

SUMMARY OF THE INVENTION

The present invention provides an improved method for conditioning softwood logs prior to the peeling operation which alleviates many of the prior art problems associated with peeling.

It is an object of the invention to provide a method for improving the yield and grade of veneer from softwood logs.

It is a further object of this invention to provide a soaking process which requires shorter soaking times.

It is also an object of this invention to provide a soaking process which has lower energy requirements.

The present invention contemplates a method for the production of softwood veneer comprising the steps of soaking softwood logs in a vat containing hot water and at least about 0.003% by weight of urea, and peeling veneer from the log.

The present invention further contemplates a composition of matter for addition to softwood log soaking vats to improve the yield and grade of peeled veneer, which composition comprises urea, a base, a wetting agent, an anti-foaming agent, and water.

DESCRIPTION OF THE INVENTION

The present invention finds utility in the processing of softwood logs or blocks into veneers for use in plywood and similar applications. The process is suitable for any softwood such as pine, Douglas fir, spruce, hemlock, and the like.

As a result of employing urea as a conditioning agent according to the present invention, the overall peeling process is greatly improved. Better heat penetration into the logs is achieved in the soaking treatment of this invention. Moreover, the problems associated with areas around the knots and spinoffs in general are greatly reduced. In addition to improving the peeling quality, the shorter soaking time (up to 50% shorter) made possible by the present invention result in greater energy savings through reduction of heat input requirements. The use of the conditioning agent of the present invention has the further advantage of providing operation with reduced odor levels in the vat water and results in cleaner vat operation. Most importantly, the process according to the present invention has absolutely no detrimental effect on the structure or strength of the veneer product.

In the conventional veneer production process softwood logs which have been mechanically debarked are soaked for 8 to about 24 hours in a hot water which may have been neutralized to a pH of about 7 before log addition. This initial neutralization step was effected primarily to reduce odors and was not intended to affect the peeling properties of the logs. During this soaking period, the heat and moisture penetration into the logs partially softens the wood. The softened logs are then fed to a peeler which cuts a thin continuous layer from the surface of the log.

The first step of the process of the present invention comprises soaking the softwood logs in hot water vats containing urea or mixtures of urea with a base. The urea is added to the vat water in an amount of at least 0.003% by weight. The upper limit of vat concentration is not critical and generally is determined by practical considerations such as the cost of the conditioning agent. Concentrations above about 2% by weight may adversely affect the conditioned log properties depending on the particular wood being treated, e.g., by making the log too soft to peel effectively. One of ordinary skill in the art, however, could readily determine the maximum upper limit for any given system. Preferably, the urea is added in an amount of from about 0.003% to about 1%. Most preferred are additions in the range of from about 0.003% to about 0.1% by weight. The latter range gives optimum effect at the lowest cost.

Preferably, the urea is added to the vat water in the form of a premixed aqueous solution. The most preferred vat concentrations, for example, can be achieved by adding to each 10,000 gallons of vat water from about 30 to about 150 pounds of an aqueous solution containing about 10 to about 50 percent by weight of the urea. The preferred range of aqueous additive is from about 75 to about 125 pounds of a solution containing from about 20 to 40 percent by weight of urea. Most preferred are about 30 percent urea solutions added at a rate of about 100 pounds for each 10,000 gallons of vat water.

The soaking treatment may be carried out at any temperature below 100° C. Temperatures in the range of from about 40° C. to about 80° C. provide optimum peeling performance while keeping the energy requirements of the process low. While soaking treatments of the prior art (water only) generally lasted for up to about 24 hours, the process of the present invention achieves enhanced peeling conditioning in about half the time with best results achieved in from about 10 to about 15 hours. Of course, the time and temperature employed according to the present invention will depend on the type of wood, the diameter of the logs and similar factors, and one skilled in the art could readily determine by simple experimentation the optimum parameters for any given set of conditions.

Urea addition is effective to achieve enhanced peeling properties regardless of the vat water pH. The pH of vat soaking water after exposure to the wood material drops to the range of about 4 to 6 due to the acidic nature of the leachable wood chemicals. Urea can be added directly to this low pH of water. Suitable results are also achieved when urea is added to water which has previously had the pH adjusted to about 7.

In a preferred embodiment, the conditioning agent of the present invention comprises a mixture of urea and a base. The base can be any alkaline material which is employed at an amount sufficient to keep the pH of the soaking vat water in the range of from about 6 to about 8 throughout the soaking period. Even when the pH of the vat water is adjusted to about 7 before adding the logs, the pH falls off as the soaking continues. Optimum results are achieved when the added base is sufficient to keep the pH between about 6.5 to about 7.5. Among the preferred bases are alkali and ammonium bases such as sodium hydroxide, potassium hydroxide, sodium carbonate, ammonium hydroxide and the like. The most preferred base is sodium hydroxide.

While not wishing to be bound by any particular theory, applicant believes that the urea has a plasticizing effect on the cellulose fibers (especially hemicellulose). The plasticizing action of the urea conditioning agent greatly enhances the peeling characteristics of the wood. Moreover, the residual urea remaining in the wood appears to enhance the gluing properties of the veneer in plywood and similar products. Applicant also believes that the base component of the mixed conditioning agent preferentially attacks the natural wood binders such as the lignin and gums. These binders undergo chemical changes and some degree of degradation upon contact with a base. The weakened wood bond resulting from this action enhances the peeling characteristics of the wood. Applicants believe that the optimum peeling enhancement achieved by this combined conditioning agent is a result of both mechanisms postulated above, i.e., binder degradation by the basic component and cellulose plasticizing by the urea component.

In bending and shaping processes requiring extreme wood flexibility, the prior art has employed various plasticizing agents including urea. See, for example, Loughborough U.S. Pat. No. 2,298,017 and Hamill U.S. Pat. No. 2,414,808. The aim in those processes, however, is to achieve external flexibility and relatively high concentrations of urea have been employed. Wood treated in this manner is too plastic to be suitable for the peeling operation. Other known plasticizing agents include anhydrous ammonia; see Schuerch U.S. Pat. No. 3,282,313.

When the conditioning agent of the present invention is added to the vat water as an aqueous solution, this aqueous solution preferably also can contain a wetting agent and an anti-foaming agent. Any conventional wetting agent may be employed. Preferred are anionic surfactants, such as sodium alkyl naphthalene sulfonates, and nonionic surfactants such as polyethylene oxide derivatives. Any of the conventional anti-foaming agents, such as sulfonated oils, organic phosphates, silicone fluids and the like, may also be employed.

The soaking step of the present invention is essentially batchwise in operation. Under the preferred embodiment, an aqueous additive charge of the conditioning agent is added with each charge of logs to be treated. Upon removal from the soaking vats, the conditioned logs are fed directly to a veneer peeler. The vat water can be reused a number of times if a new charge of conditioning agent is added with each new charge of logs. In the peeling step of the process a thin continuous layer of wood is peeled off from the log surface. The peeling operation may be accomplished by any of the known methods including lathe-type peeling of the surface of a rotating log.

The following specific examples are intended to illustrate more fully the nature of the present invention without acting as a limitation on its scope.

EXAMPLE 1

This Example demonstrates the process of the present invention employing urea as the conditioning agent. An aqueous additive solution of urea is prepared by combining the following materials in the proportions indicated:

Water: 69.57 (parts by weight)
Urea: 29.56 (parts by weight)
MORWET B ®*: 0.17 (parts by weight)
NALCO 40B03 ®**: 0.70 (parts by weight)

Approximately 100 pounds of this aqueous solution is employed for each 10,000 gallons of vat water. The soaking treatment is carried out at a temperature of about 62° C. for about 12 hours. The peel performance resulting after this treatment is greatly improved over that of the conventional soaking process.

*A trademark registered by the Petrochemicals Co. of Fort Worth, Texas, for a wetting agent comprising a Na-n-butyl naphthalene sulfonate.

**A trademark registered by the Nalco Chemical Co. of Houston, Texas, for an anti-foaming agent.

EXAMPLE 2

This Example demonstrates the use of a mixed conditioning agent containing both urea and a base. The conditioning agent was prepared in aqueous additive solution form as follows:

Water: 52.18 (parts by weight)
50% Caustic Soda: 34.78 (parts by weight)
Urea: 12.17 (parts by weight)
MORWET B ®: 0.17 (parts by weight)
NALCO 40B03 ®: 0.70 (parts by weight)

This softening agent was employed in the manner as Example 1 and also demonstrates superior peel performance.

While certain specific embodiments have been described with particularity herein, it should be recognized that various modifications thereof will occur to those skilled in the art. Therefore, the scope of the invention is to be limited solely by the scope of the claims appended hereto.

I claim:

1. A composition of matter for addition to softwood log soaking vats to improve the yield and grade of peeled veneer, said composition consisting essentially of from about 10 to about 50% by weight urea, a base selected from the group consisting of sodium hydroxide, potassium hydroxide, sodium carbonate and ammonium hydroxide, said base being present in said composition in an amount sufficient to keep the pH of the water in said log soaking vats in the range of from about 6 to about 8 throughout the soaking period, and water.

2. The composition of claim 1 wherein said base is sodium hydroxide.

3. The composition of claim 1 further containing a material selected from the group consisting of an anti-foaming agent, a wetting agent and mixtures thereof.

* * * * *